Oct. 24, 1967  N. K. LINDGREN  3,348,300
METHOD OF MANUFACTURING ELECTRIC MOTORS
Original Filed Jan. 19, 1961  2 Sheets-Sheet 1
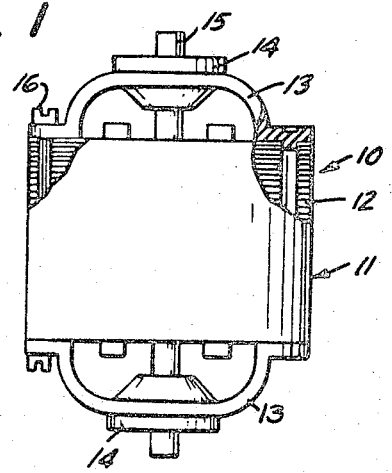
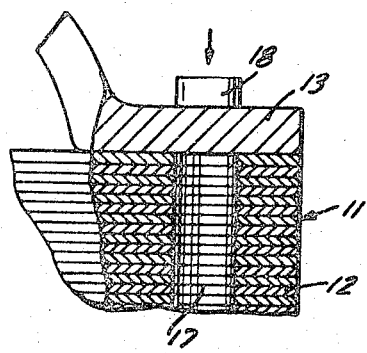
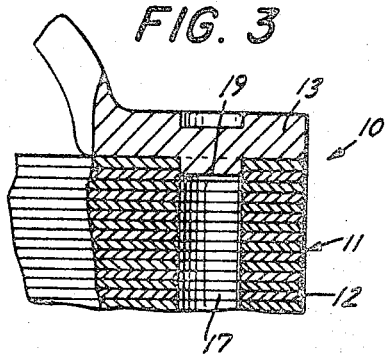
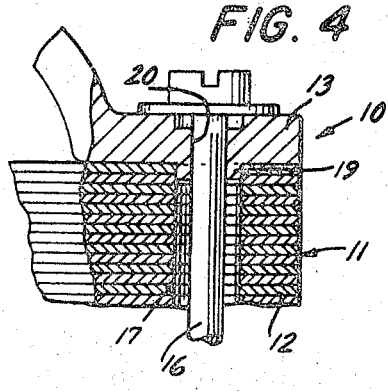
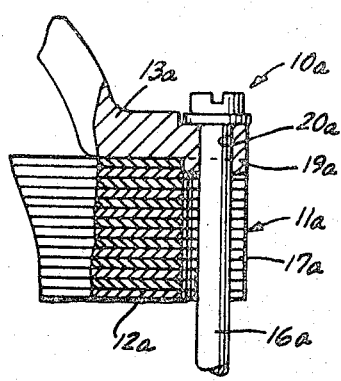
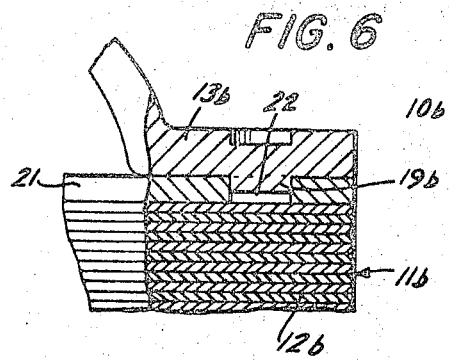
INVENTOR.
Nils Kauri Lindgren
BY
his ATTORNEY

United States Patent Office 3,348,300
Patented Oct. 24, 1967

3,348,300
METHOD OF MANUFACTURING ELECTRIC MOTORS
Nils Kauri Lindgren, Stockholm, Sweden, assignor to Aktiebolaget Electrolux, Stockholm, Sweden, a corporation of Sweden
Original application Jan. 19, 1961, Ser. No. 83,814, now Patent No. 3,200,275, dated Aug. 10, 1965. Divided and this application Sept. 16, 1964, Ser. No. 396,916
Claims priority, application Sweden, Jan. 20, 1960, 541/60
4 Claims. (Cl. 29—596)

This invention relates to a method of manufacturing electric motors, and more particularly is concerned with a method of making electric motors of the type in which the stator serves as the housing of the motor and structures are provided at opposite ends of the stator for carrying bearings in which the motor shaft is journaled. This application is a division of copending application Ser. No. 83,814, filed Jan. 19, 1961, now Patent No. 3,200,275, granted Aug. 10, 1965.

In existing electric motors of the described character, the bearing support structures or seats are mounted against the end surfaces of the stack of laminations or plates forming the stator or against projections provided at the edge portions of the latter, and the bearing support structures and laminated stator are held axially together by bolts extending therethrough. However, such existing arrangements for securing the bearing support structures or seats to the laminated stator do not satisfactorily fix the positions of the bearings relative to each other and to the stator, particularly as regards rotational and radial displacements thereof. Further, displacement of the bearing support structures or seats relative to each other and the stator may be caused by dimensional changes occurring in the laminated stator, for example, as a result of heating of the latter.

Accordingly, it is an object of this invention to provide improved means by which the bearing support structures or seats are securely fixed relative to the laminated stator in an electric motor of the described character.

Another object is to provide a simpler and less expensive construction for electric motors of the described character.

In accordance with an aspect of the invention, the bearing support structures or seats at the opposite ends of the laminated stator are fixedly secured against rotation and radial displacement relative to the stator by cooperatively engaging projections and recesses defined by portions of the bearing support structures or seats and by parts of the stator, respectively, or by parts of the stator and portions of the bearing support structures or seats, respectively, with the projections or recesses of the bearing support structures being defined by portions of the latter which are molded, pressed or struck therefrom.

In one form of the invention, recesses opening axially at the ends of the stack of plates forming the laminated stator are engaged by projections which are molded, pressed or struck from the bearing support structures or seats.

In another form of the invention, the laminations or plates forming the stator are held together by tubular spacers extending closely through axially aligned openings provided in the plates, and the opposite ends of the tubular spacers project beyond the ends of the stator and cooperatively engage either projections or recesses which are defined by portions molded, pressed or struck from the bearing support structures or seats. In this form of the invention, the ends of the tubular spacers projecting beyond the ends of the laminated stator are preferably diametrically expanded so that such tubular spacers constitute hollow rivets for securing together the laminations or plates of the stator.

The above, and other objects, features and advantages of the invention, will be apparent in the following detailed description of illustrative embodiments thereof which is to be read in connection with the accompanying drawings, forming a part hereof, and wherein:

FIG. 1 is an elevational view of an electric motor embodying the present invention, and which is shown partly broken away and in section;

FIG. 2 is an enlarged fragmentary sectional view illustrating a portion of the structure of the motor of FIG. 1 at an intermediate stage in the manufacture thereof;

FIG. 3 is a view similar to that of FIG. 2, but showing the illustrated structure at a later stage in the manufacture of the motor;

FIG. 4 is a view similar to that of FIG. 3, but illustrating another embodiment of the invention;

FIG. 5 is a view similar to that of FIG. 3, but showing still another embodiment of the invention;

FIG. 6 is a view similar to that of FIG. 3, but showing still another embodiment of the invention;

Figure 7:
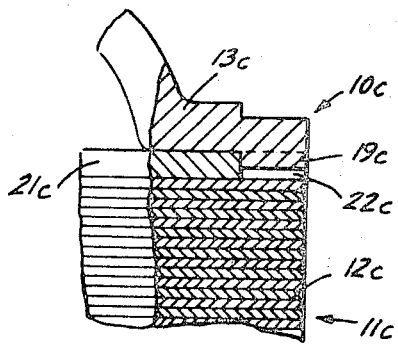
FIG. 7 is a view similar to that of FIG. 3, but showing still another embodiment of the invention.

Referring to the drawings in detail, and initially to FIG. 1 thereof, it will be seen that an electric motor 10 of the kind to which the invention relates generally includes a stator 11 formed by a stack or pack of annular laminations or plates 12 which define the motor housing, and bearing support structures or seats 13 secured at the opposite ends of stator 11 and carrying bearings 14 in which the motor shaft 15 is rotatably mounted. The bearing support structures or seats 13 are held axially against the ends of stator 11 by bolts 16 which extend axially through plates 12 of stator 11 and bearing support structures 13.

In accordance with the present invention, as llustrated in FIG. 2, the plates 12 of stator 11 are formed with aligned openings defining bores 17, only one of which appears in FIG. 2, extending axially through the stator, and therefore providing axially opening recesses at the opposite ends of the stator. Each of the bearing support structures or seats 13 is placed against the related end of stator 11 and pressed, molded or struck, as by a suitable tool diagrammatically illustrated at 18 (FIG. 2), so that the metal forming the bearing support structure or seat 13 is plastically deformed to provide a projection 19 (FIG. 3) extending axially into the recess or adjacent open end of each bore 17 of stator 11.

It will be apparent that the cooperative engagement of each projection 19 with the related recess defined by the end of a bore 17 of stator 11 securely fixes the bearing support structure or seat 13 against rotation or radial displacement relative to the stator, each projection 19 having a convex surface cooperating with a different one of the recesses having a coacting concave surface facing radially outward from the axis of the motor shaft 15.

As shown in FIG. 4, the bores 17 formed by the holes provided in plates 12 of stator 11 to define the recesses opening axially at the opposite ends of the latter, and which are primarily intended for receiving the projections 19 pressed, molded or struck from the metal forming the bearing support structures 13, may also receive the bolts 16, in which case, the bearing support structures or seats 13 have holes 20 drilled therein, either before or after the formation of the projections 19, with the holes 20 being in alignment with the bores 17 to receive the bolts 16 passing through the latter. Thus, the bolts 16 may be drawn up or tightened to axially secure the bearing support structures or seats 13 to the stator 11 and also to compact or compress the laminations or plates 12 of the stator.

In FIGS. 1 to 4, inclusive, the bores 17 defining the recesses opening axially at the opposite ends of stator 11 to receive the projections 19 pressed, molded or struck from the metal forming the bearing support structures or seats 13 are formed by holes which are located intermediate the inner and outer peripheries of the annular plates or laminations 12 of the stator. However, as shown in FIG. 5, an electric motor 10a embodying the present invention may have the annular plates or laminations 12a of its stator 11a provided with aligned notches or cutouts in the outer peripheries thereof to form axially extending grooves or troughs 17a having concave surfaces facing radially outward from the axis of the motor shaft 15 at the outer surface of the stator and defining recesses opening axially at the opposite ends of the stator. In accordance with the invention, such recesses receive projections 19a which are molded, pressed or struck from the metal forming the bearing support structures or seats 13a so that the cooperative engagement of the projections 19a with the recesses defined by the ends of the grooves or troughs 17a fixedly secures the bearing support structures or seats 13a against rotation and radial displacement relative to stator 11a. Further, as is apparent in FIG. 5, the bearing support structures or seats 13a may be formed with holes 20a aligned with the grooves or troughs 17a to receive bolts 16a extending through the latter, and by which the bearing support structures are held axially against the opposite ends of the stator.

Although the bearing support structures or seats bear directly against the opposite ends of the stack of laminations or plates forming the stator in the embodiments illustrated in FIGS. 3, 4 and 5, and have their molded, pressed or struck projections 19 or 19a engaged in recesses defined by the opposite ends of bores 17 or grooves 17a extending axially throughout the stack of laminations or plates, it is to be noted that such molded, pressed or struck projections may be engaged in recesses that are formed only at the opposite ends of the stator structure. Thus, as shown in FIG. 6, the stator 11b of an electric motor 10b has the usual stack of annular laminations or plates 12b and relatively thicker end plates 21 disposed at the opposite ends of such stack, and the projections 19b which are molded, pressed or struck from the bearing support structures or seats 13b engage in recesses or openings 22 formed only in the end plates 21. In the arrangement of FIG. 6, the end plates 21 and annular laminations or plates 12b of stator 11b and the bearing support structures or seats 13b may be held axially together by bolts (not shown) extending through aligned holes in plates 12b and 21 and in seats 13b at locations that are spaced circumferentially from the locations of projections 19b and the cooperating recesses 22. Thus, such bolts, which are similar to the bolts 16 and 16a of FIGS. 4 and 5, axially secure together the stator and bearing support structures, while the cooperative engagement of the projections 19b with the recesses 22 fixedly secure the bearing support structures 13b against rotation and radial displacement relative to the stator 11b, each projection 19b having a convex surface cooperating with a different one of the recesses 22 having a coacting concave surface facing radially outward from the axis of the motor shaft 15.

The recesses 22 and the cooperating projections 19b may be spaced radially inward from the outer peripheries of the end plates 21 and bearing support structures 13b, as in FIG. 6, or the end plates 21c of the stator 11c may be formed with recess defining cutouts 22c in the outer peripheries thereof to receive similarly located projections 19c which are molded, pressed or struck from the bearing support structures 13c, as in FIG. 7.

In the previously described embodiments of the invention, the bearing support structures or seats have abutted either directly against the ends of the stack of laminations or plates forming the stator, as in FIGS. 4 and 5, or against the end plates disposed at the opposite ends of such stack, as in FIGS. 6 and 7. However, since the distance between the ends of the stator may change, for example, as a result of deposits between the laminations or plates of the stack upon heating of the stator, it is possible for the bearing support structures or seats to be displaced relative to each other, thereby altering the locations of the bearings in which the motor shaft is mounted. In order to avoid this possibility, an electric motor 10d (FIGS. 8 and 9) embodying the present invention may have tubular spacers 23 extending axially through aligned openings in the laminations 12d and plates 21d of its stator 11d, with the opposite ends of spacers 23 extending beyond the end plates 21d and being diametrically enlarged, as at 24, so that the tubular spacers 23 act as hollow rivets for securing together the laminations 12d and plates 21d. Further, the diametrically enlarged end portions 24 of the tubular spacers 23 define axially opening recesses into which projections 19d (FIG. 9) may be molded, pressed or struck from the metal forming the bearing support structures or seats 13d, for example, by the action of a tool diagrammatically indicated at 18d in FIG. 8.

The bearing support structures or seats 13d may also be formed with openings 20d either before or after the projections 19d are molded, pressed or struck therefrom, and such openings 20d are aligned with the tubular spacers 23 so that bolts 16d can extend axially through the tubular spacers 23 and the openings 20d for axially securing the bearing support structures against the ends of the tubular spacers. It will be apparent, that, as in the previously described embodiments, the projections 19d engaging in the recesses defined by the ends 24 of spacers 23 prevent rotation and radial displacements of the bearing support structures or seats 13d relative to the stator 11d, each projection 19d having a convex surface cooperating with a different one of the recesses having a coacting concave surface facing radially outward from the axis of the motor shaft 15. Further, since the bearing support structures or seats 13d bear against the ends 24 of spacers 23, the latter positively establish or fix the axial distance between the bearing support structures at the opposite ends of the stator, and such distance is not influenced by any dimensional changes in the stack of laminations or plates 12d forming the stator.

Figure 10:
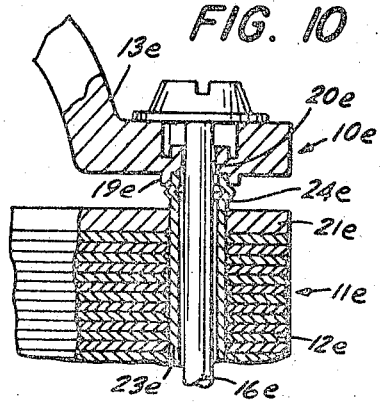
FIG. 10 is a view similar to that of FIG. 9 but showing a modification of the construction illustrated therein.

In all of the previously described embodiments of the invention, rotation and radial displacement of the bearing support structures or seats relative to the stator has been prevented by projections which are molded, pressed or struck from the metal forming the bearing support structure and which engage in cooperating recesses defined by parts of the stator. However, this arrangement may be reversed, that is, portions of the metallic bearing support structures or seats may be molded, pressed or struck therefrom so as to define recesses which accommodate projections extending from the opposite ends of the stator. For example, as illustrated in FIG. 10, in an electric motor 10e embodying the invention, annular ribs 19e are molded, pressed or struck from the metal forming each bearing support structure or seat 13e so as to each define a circular recess opening towards the adjacent end of the stator 11e and adapted to receive the projecting end 24e of the tubular spacer 23e by which the plates 12e and 21e of the stator are held axially together. In the electric motor 10e, the bearing support structures or seats 13e are once again held axially against the ends of the tubular spacers 23e by means of bolts 16e extending axially through the tubular spacers and through openings 20e formed in the bearing support structures concentrically with the annular ribs 19e which are molded, pressed or struck therefrom. It will be apparent that the cooperative engagement of the ends 24e of the spacers 23e in the recesses defined by the annular ribs 19e fixedly secures the bearing support structures or seats 13e against rotation and radial displacement relative to the stator 11e, each projecting end 24e of one of the spacers 23e having a convex surface cooperating with a different one of the recesses having a coacting concave surface facing radially outward from the axis of the motor shaft 15.

Figure 8:
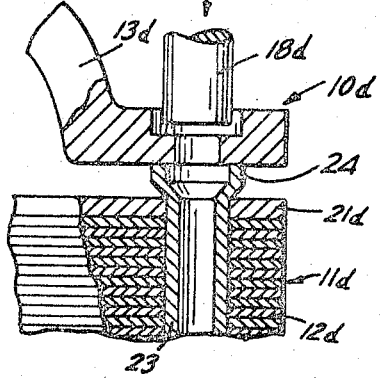
FIG. 8 is a view similar to that of FIG. 2, but illustrating an intermediate stage in the manufacture of an electric motor in accordance with still another embodiment of the invention.
Figure 9:
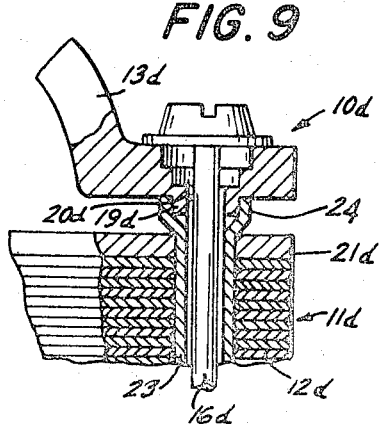
FIG. 9 is a view similar to that of FIG. 4, but showing the final configuration of the electric motor manufactured in accordance with the embodiment of the invention illustrated in FIG. 8.
Figure 11:
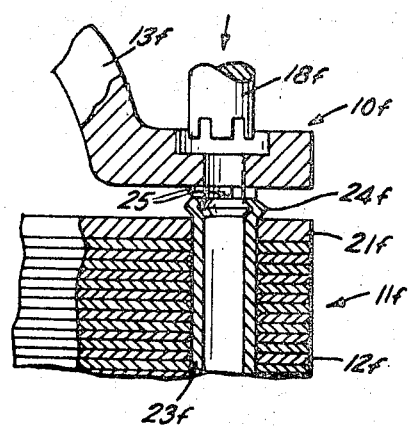
FIG. 11 is a view similar to that of FIG. 8, but illustrating an intermediate stage in the manufacture of an electric motor in accordance with still another embodiment of the invention.
Figure 12:
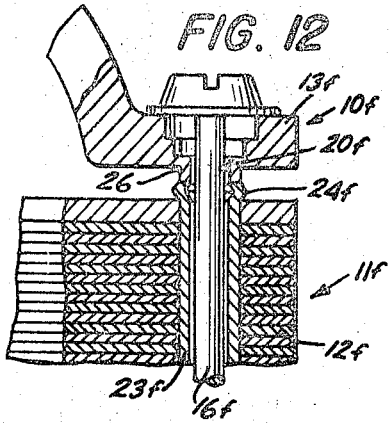
FIG. 12 is a view similar to that of FIG. 9, but illustrating the completed condition of the electric motor constructed in accordance with the embodiment of FIG. 11.

A further modification of the embodiment of FIGS. 8 and 9 is illustrated in FIGS. 11 and 12, wherein the end portions 24f of the tubular spacers 23f which secure together the plates 12f and 21f of the stator 11f are formed with circumferentially spaced apart, axially opening recesses or cutouts 25 (FIG. 11), and the metal forming each bearing support structure 13f is molded, pressed or struck by a suitable tool diagrammatically indicated at 18f so as to provide similarly spaced apart projections or tabs 26 (FIG. 12) which engage in the cutouts or recesses 25 at the end edges of tubular spacers 23f, thereby to prevent rotation and radial displacement of the bearing support structures or seats 13f relative to the stator 11f of the electric motor 10f. As in the previously described embodiments, the bearing support structures 13f may be formed with openings 20f aligned with the spacers 23f to receive the bolts 16f extending through the latter, and by which the bearing support structures are axially secured to the stator.

In view of the foregoing, it will now be understood in making the improved stationary unit of an electric motor described above, a stator core structure and bearing support structure at an end of the unit are placed in juxtaposition to each other with the bearing support structure distributed over a lateral end face of the stator core structure and in the position it assumes when mounted on the stator core structure. Before the structures are placed in juxtaposition to each other, the stator structure at an end thereof is provided with locating recesses, such as the bores 17 in FIG. 2 or the open-ended tubular members 23 in FIG. 8, for example, which extend axially of the unit.

While the bearing structure is in the aforementioned position with respect to the stator core structure, the bearing support structure is deformed at the vicinities of the locating recesses to displace and move metal forming the bearing support structure which is integral therewith into interlocking relation with the locating recesses, as shown in FIGS. 3 and 9, for example, to mount the bearing support structure on the stator core structure and prevent rotation and radial displacement of the bearing support structure with respect to the stator core structure it is mounted thereon.

As shown in FIGS. 9, 10 and 12, each interlocking portion of one of the bearing support and stator core structures is indepnedently located at a different one of the other interlocking portions of the bearing support and stator core structures and prevents relative movement therebetween in any direction in a plane normal to the axis of the motor shaft. Further, in FIGS. 9 and 10, each of the projections formed at the ends of the tubular members of the stator core structure is independently located completely about a peripheral surface thereaof at a different one of the recesses formed in the bearing support structures and prevents relative movement therebetween in any direction in a plane normal to the axis of the motor shaft.

Although the stator of each of the embodiments illustrated in FIGS. 9, 10 and 12 includes end plates 21d, 21e or 21f at the opposite ends of the stack of laminations, it is apparent that such end plates may be eliminated, as in the embodiments of the invention previously described herein with reference to FIGS. 4 and 5.

Although illustrative embodiments of the invention have been described in detail herein with reference to the accompanying drawings, it is to be understood that the invention is not limited to those precise embodiments, and that various changes and modifications may be effected therein without departing from the scope or spirit of the invention, except as defined in the appended claims.

What is claimed is:
1. The method of making a stationary unit of an electric motor including a stack of metal plates forming a stator part having elongated passageways extending therethrough and elongated tubular members which extend through the passageways and include end portions which project beyond the opposing ends of the stator part and are formed to function as rivets to hold the stack of metal plates together and a metallic bearing support part at each end of the stator part for rotatably mounting a rotor shaft, said method comprising the steps of:
   stacking the metal plates to form the stator part,
   drilling the metal plates to form the plurality of elongated passageways which are spaced from one another and extend axially between the opposing ends of the stator part,
   positioning in the elongated passageways the hollow tubular members which extend therethrough and have end zones projecting beyond the opposing ends of the stator part,
   the walls of the end zones of the tubular members projecting beyond one end wall of the stator part having (a) first axially extending sections which flare outward from the immediate vicinity of the one end wall of the stator part to a first region axially removed from the one end wall of the stator part and also having (b) second sections which extend axially of the stator part from the first region to the extreme ends of the tubular members and define recesses,
   positioning one of the metallic bearing support parts at the one end of the stator part with one surface thereof overlying the recesses formed in the second axially extending sections of the end zones of the tubular members and in abutting relation therewith, and
   while the one bearing support part and the recesses in the second axially extending sections are in said abutting relation at the one end of the stator part, deforming the one bearing support part at the vicinities of the recesses to flow metal of the bearing support part axially of the stationary unit of the electric motor to form projections which are integral with the one bearing support part and extend into the recesses into interlocking relation with the hollow tubular members.

2. The method of making a stationary unit of an electric motor as set forth in claim 1 which further includes the steps of:
   drilling the one metallic bearing support part, after the latter has been deformed to form the projections, to form spaced openings which extend axially therethrough at the immediate vicinities of the projections and form passageways in the one bearing support part which also pass through the projections, and
   holding the one metallic bearing support part in interlocking relation with the hollow tubular members with the aid of bolts which pass through the hollow tubular members and the openings in the one bearing support part.

3. The method of making a stationary unit of an electric motor as set forth in claim 1 which further includes the step of:

expanding the walls of the end zones of the tubular members projecting beyond the one end wall of the stator part to form the first and second axially extending sections after positioning the hollow tubular members in the elongated passageways of the stator part with the end zones thereof projecting beyond the opposing ends of the stator part.

4. The method of making a stationary unit of an electric motor including a stack of metal plates forming a stator part having elongated passageways extending therethrough and elongated tubular members which extend through the passageways and include end portions which project beyond the opposing ends of the stator part and are formed to function as rivets to hold the stack of metal plates together and a metallic bearing support part at each end of the stator part for rotatably mounting a rotor shaft, said method comprising the steps of:

stacking the metal plates to form the stator part, drilling the metal plates to form the plurality of elongated passageways which are spaced from one another and extend axially between the opposing ends of the stator part, positioning in the elongated passageways the hollow tubular members which extend therethrough and have end zones projecting beyond the opposing ends of the stator part, the walls of the end zones of the tubular members projecting beyond one end wall of the stator part having (a) first axially extending sections which flare outward from the immediate vicinity of the one end wall of the stator part to a first region axially removed from the one end wall of the stator part and also having (b) second sections which extend axially of the stator part from the first region to the extreme ends of the tubuar members and define recesses, drilling one of the metallic bearing support parts to form spaced openings which extend therethrough, positioning the one bearing support part at the one end of the stator part with one surface thereof overlying the recesses formed in the second axially extending sections of the end zones of the tubular members and in abutting relation therewith with the openings in the one bearing support part in axial alignment with the recesses in the second axially extending sections of the end zones, and while the one bearing support part and the recesses in the second axially extending sections are in said abutting relation at the one end of the stator part, deforming the one bearing support part at the vicinities of the openings therein and at the vicinities of the recesses to flow metal of the bearing support part axially of the stationary unit of the electric motor to form projections which are integral with the one bearing support part and extend into the recesses into interlocking relation with the hollow tubular members, and effecting such deformation of the one bearing support part at the vicinities of the recesses to retain the openings in the one bearing support part which extend therethrough and also through the projections integral therewith, and holding the one metallic bearing support part in interlocking relation with the hollow tubular members with the aid of bolts which pass through the hollow tubular members and the openings in the one bearing support part and the projections integral therewith.

References Cited

UNITED STATES PATENTS

| | | | |
|---|---|---|---|
| 666,655 | 1/1901 | Eaton | 29—155.5 |
| 1,812,151 | 6/1931 | Jacocks | 29—521 XR |
| 1,934,903 | 1/1933 | Apple | 29—155.5 XR |
| 2,781,165 | 2/1957 | Troller | 230—117 |
| 2,870,356 | 1/1959 | Gibson | 310—258 |
| 2,939,021 | 5/1960 | Gilchrist | 310—258 XR |
| 2,975,312 | 3/1961 | Ploran | 29—521 XR |
| 2,975,928 | 3/1961 | Roovers. | |
| 3,045,137 | 7/1962 | Simmons et al. | 310—258 |
| 3,077,030 | 2/1963 | Carlson | 29—407 |
| 3,241,397 | 3/1966 | Wilkinson. | |

JOHN F. CAMPBELL, *Primary Examiner.*

R. W. CHURCH, *Assistant Examiner.*